United States Patent [19]

Oswald

[11] 3,884,951

[45] May 20, 1975

[54] THIOETHER ISOCYANATE ADDUCTS

[75] Inventor: Alexis A. Oswald, Mountainside, N.J.

[73] Assignee: Exxon Research & Engineering Company, Linden, N.J.

[22] Filed: Jan. 18, 1971

[21] Appl. No.: 107,474

Related U.S. Application Data

[62] Division of Ser. No. 759,200, Sept. 11, 1968, Pat. No. 3,597,341.

[52] U.S. Cl. ............... 260/453 A; 71/98; 71/100; 71/104; 260/75 NT; 260/77.5 AT; 260/448.2 R; 260/453 AL; 260/453 AR; 260/453 P; 260/454; 260/455 A; 260/470; 260/481 C; 424/298; 424/302
[51] Int. Cl. .......................................... C07c 119/04
[58] Field of Search.... 260/453 AL, 453 A, 453 AR

[56] References Cited
UNITED STATES PATENTS

| | | | |
|---|---|---|---|
| 2,340,757 | 3/1938 | Kaase et al. ...................... | 260/453 |
| 3,215,701 | 11/1965 | Pomot............................ | 260/453 X |
| 3,409,631 | 11/1968 | Hollschmidt et al............ | 260/453 X |
| 3,519,686 | 7/1970 | Nair................................ | 260/453 X |

FOREIGN PATENTS OR APPLICATIONS 981,346    1/1965   United Kingdom

*Primary Examiner*—Lewis Gotts
*Assistant Examiner*—Dolph H. Torrence
*Attorney, Agent, or Firm*—J. P. Corcoran; R. J. Baran

[57] ABSTRACT

Novel thioether isocyanates and isothiocyanates can be produced by the addition of thiols to the olefinic bonds of allyl isocyanates and isothiocyanates. They are useful as pesticides, especially as post-emergence herbicides, and as polymer intermediates.

3 Claims, No Drawings

THIOETHER ISOCYANATE ADDUCTS

CROSS-REFERENCE TO OTHER APPLICATIONS

This application is a divisional of an application bearing U.S. Ser. No. 759,200, filed Sept. 11, 1968, U.S. Pat. No. 3,597,341 in the name of Alexis A. Oswald.

PRIOR ART

It is known that isocyanates and isothiocyanates react with thiols under ionic conditions, especially at elevated temperatures, to yield thiourethanes. For references see H. L. Snape, Ber. Vol. 18, pages 24–32 (1885); E. Dyer and J. F. Glenn, J. Am. Chem. Soc., Vol. 79, p. 366 (1957); U.S. Pat. No. 2,764,592.

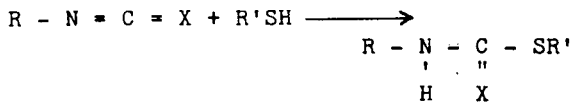

R,R' = organic radical; X = O,S

Such formation of thiourethanes is accelerated by ionic catalysts and heating.

However, the prior art has not been cognizant of the selective low temperature reaction of the olefinic group of unsaturated isocyanates and/or isothiocyanates with thiols under free radical conditions to form novel, useful anti-Markovnikov type adducts.

FIELD OF THE INVENTION

This invention relates to novel thiol adducts of allylic isocyanates and isothiocyanates, formulations or compositions thereof, and process or methods for preparing and using same. More particularly, this invention relates to novel thioether isocyanates, produced by the selective free radical addition of thiols to the olefinic double bond of allylic isocyanates and isothiocyanates. Such adducts are useful as pesticides, particularly as post-emergence herbicides and as polymer intermediates, particularly polyurethane intermediates.

SUMMARY OF THE INVENTION

The novel anti-Markovnikov adducts of this invention are generally prepared in the course of a free radical addition process wherein a variety of thiols can be added to the olefinic double bond of a variety of allylic isocyanates and isothiocyanates.

In general, the reaction can be depicted by the following reaction scheme

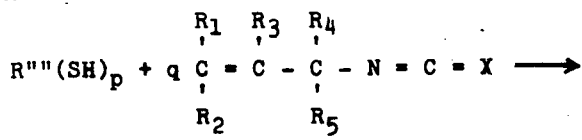

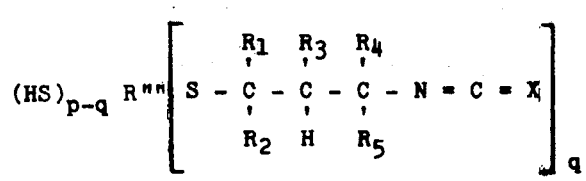

wherein X is oxygen and sulfur, preferably oxygen, and $p$ and $q$ are each a positive integer from 1 to 30, preferably 1 to 5, most preferably 1 to 3, with $q$ being equal to or smaller than $p$ and the meaning of the various R groups is defined in the following $R''''$ is a mono-, di- or polyvalent organic radical selected from the group consisting of unsubstituted and substituted $C_6$ to $C_{200}$, preferably $C_1$ to $C_{20}$, hydrocarbon radicals whose substituents are sulfur, oxygen and silicon. The '''' hydrocarbon radicals can be open chain and cyclic aliphatic, and aromatic radicals. It is, however, preferred that they should be selected from saturated open chain aliphatic radicals and nonfused benzenoid radicals, such as phenylene with possible phenyl and alkyl substituents, respectively. The nonhydrocarbon substituents of these radicals are preferably selected from the group consisting of chlorine, bromine, $C_1$–$C_4$ alkylthio, hydroxy, $C_1$–$C_4$ alkyloxy, $C_1$–$C_4$ alkylsulfonyl, phenylsulfonyl, cyano, $C_1$–$C_4$ carboalkoxyalkyl, acetyl, nitro.

Examples of the various $R''''$ polyvalent radicals are provided in the specification when discussing monovalent radicals R, divalent radicals R', trivalent radicals R'' derived from mono-, di- and trithiol reactants. Examples of higher valent radicals are $C_6H_2(CH_2)_4$ derived from durene tetrathiol, $C(CH_2OCOCH_2CH_2)_4$ derived from methane (tetracarbomethoxyethanethiol), polyvalent hydrocarbon radicals derived from polypropylene, polybutadiene, polypropyleneoxide, polypropylenesulfide.

$R_1$ to $R_5$ are monovalent radicals selected from the group of hydrogen, methyl, chlorine, cyano, $C_1$ to $C_{12}$, preferably $C_1$ to $C_4$ alkylthio substituted methyl, phenylthio substituted methyl and combination thereof. It is, however, preferred that at least 3 of the above R radicals be hydrogen. Furthermore, it is preferred that the two remaining radicals be selected from the group of hydrogen and methyl radicals.

Preferably, the reaction is carried out with allyl isocyanate or allyl isothiocyanate as indicated by the following scheme

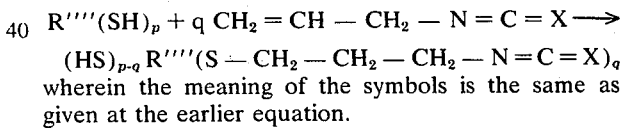

wherein the meaning of the symbols is the same as given at the earlier equation.

It is more preferred to react all the thiol groups of the polythiol as shown by the following schemes

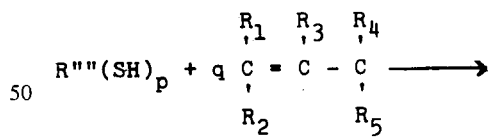

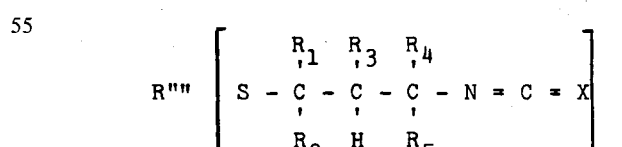

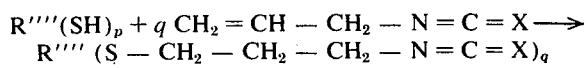

wherein $p$ equals $q$. In general, this reaction may be illustrated with allyl isocyanate and isthiocyanate in accordance with Equation 1 below.

EQUATION 1

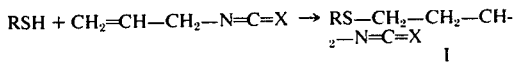
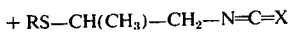

wherein X is O or S, product I is formed in major amounts, and product II is formed in minor amounts, R being $C_1$-$C_{20}$ hydrocarbyl moiety such as $C_1$ to $C_{20}$ alkyl, $C_1$ to $C_{20}$ monosubstituted alkyl, $C_1$ to $C_{20}$ disubstituted alkyl, $C_6$ to $C_{20}$ aryl, $C_6$ to $C_{20}$ monosubstituted aryl, $C_6$ to $C_{20}$ disubstituted aryl. The aliphatic moiety has preferably $C_1$ to $C_4$ carbon atoms. The aromatic moiety is preferably phenyl. Preferable substituents are chlorine, bromine, $C_1$-$C_4$ alkylthio, hydroxy, $C_1$-$C_4$ alkyloxy, $C_1$-$C_4$ alkylsulfonyl, phenylsulfonyl, cyano, $C_1$-$C_4$ carboalkoxy alkyl, acetyl, nitro, etc. Substituents, which catalyze the reaction of the thiol groups with the isocyanate or isothiocyanate groups must be absent. Such substituents are all strongly basic and acidic groups such as alkylamino, sulfonic acid, phosphonic acid, etc.

In like manner, substituted allylic isocyanates and isothiocyanates can be reacted with thiols in accordance with the following equation, Equation 2.

EQUATION 2

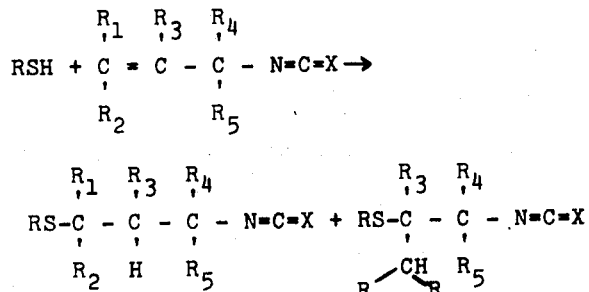

wherein X is O or S, product I is again the major product, and product II is the minor product, $R_1$ to $R_5$ being such moieties as hydrogen, $CH_3$, Cl, CN, and $C_1$-$C_{12}$ alkylthio substituted methyl, phenylthio substituted methyl, $C_6$-$C_{10}$ monosubstituted phenylthio substituted methyl, etc.

Typical; non-limiting thiol reactants include such thiols as methanethiol, propanethiol, hydroxyethanethiol, alphatoluenethiol, benzenethiol, xylenethiol, chlorobenzenethiol, t-butanethiol, 3-chloropropanethiol, hexadecanethiol, naphthalenethiol, phenanthrenethiol, anthracenethiol, trichlorobenzenethiol, bromobenzenethiol, 3-hydroxypropanethiol, carbomethoxyethanethiol, 2-methylthioethanethiol, nitrobenzenethiol, methanesulfonylbenzenethiol, cyclohexanethiol, 2-acetylethanethiol, 12-hydroxydodecanethiol, 18-carboethoxyoctadecanethiol, 5,6-dichlorohexanethiol, 2-butenethiol, 2,3-epoxypropanethiol, etc.

Typical, non-limiting isocyanate and isothiocyanate reactants of this invention include crotyl isocyanate, 2-methallyl isocyanate, 4-methylthiocrotyl isothiocyanate, 4-phenylthiocrotyl isocyanate, 4-chlorophenylthiocrotyl isocyanate, 4-nitrophenylthiocrotyl isocyanate, 2-chloroallyl isothiocyanate, xylylthiocrotyl isocyanate.

When a dithiol is reacted with an allyl isocyanate or isothiocyanate one or both thiol groups may participate in the addition reaction to the allylic double bond, as is shown in Equation 3 below.

EQUATION 3

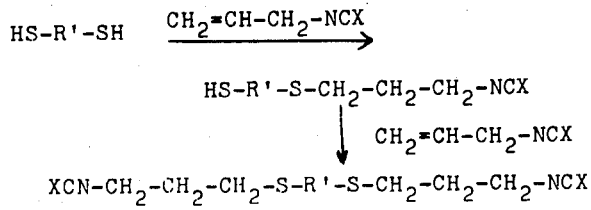

wherein R' is a divalent organic radical such as $C_1$-$C_{20}$ alkylene, $C_6$-$C_8$ phenylene, $C_6$-$C_{10}$ phenalkylene, e.g. xylylene. The alkylene group can also contain hetero atoms such as S, $SO_2$, O, $Si(CH_3)_2$ groups in which the maximum carbon number of the continuous alkylene unit is twenty, the number of alkyleneheteroatomic group units (n) being 0 to 100, e.g.:

$$-(R'-S)_nR'-; \quad -(R'-O)_nR'-;$$
$$-(R'-Si(CH_3)_2)-_nR'-$$

Typical, non-limiting dithiol reactants include 1,3-propanedithiol, 1,6-hexanedithiol, cyclooctanedithiol, cyclododecanetrithiol, 1,2-ethanedithiol, benzenedithiol, xylylene dithiol, 2-thio-bis-ethanethiol, 2-sulfonyl-bis-ethanethiol, 3-oxy-bis-propanethiol, 3-hydroxy-1,2-propanedithiol, 3-chloro-1,2-propanedithiol, polyethylenethioetherdithiol, polyethyleneoxidedithiol, polyethylenesulfonedithiol, polypropylenethioetherdithiol, etc.

The monoadduct intermediate of the dithiol-allyl isocyanate intermediate can undergo a polyselfaddition initiated by heat and/or ionic catalysts to form a polythiourethane, as shown in Equation 4 below.

EQUATION 4

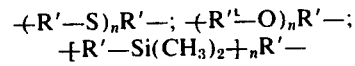
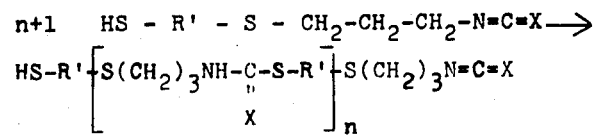

wherein $n$ is 1 to 500, preferably 20 to 200.

Alternatively, the diadduct may be reacted with a diol or dithiol to yield a polyurethane, as shown in Equation 5.

EQUATION 5

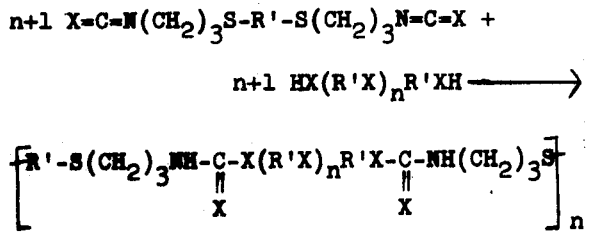

In the case of trithiol reactants, the selective additions to allyl isocyanate and isothiocyanate can be carried out to various degrees, as shown in Equation 6.

EQUATION 6

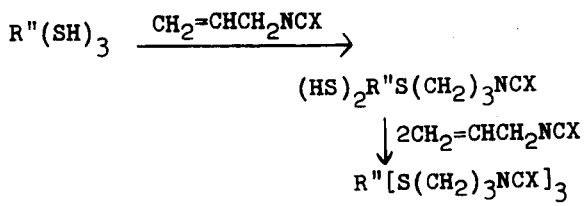

wherein (1) R″ is a trivalent unsubstituted organic radical containing from 6 to 500 carbon atoms, which radical can be substituted by such atoms as sulfur, oxygen and silicon, illustrative examples of these substituted radicals including polythioether, polyether, and polysilane trithiols, etc.; and (2) X is O and S, preferably O.

Typical, non-limiting trithiol reactants include trimercaptoethyl cyclohexane, tri-mercaptoethylthio cyclododecane, the tri-mercaptoacetic acid ester of trihydroxymethyl methane, the tetra-mercaptopropionic acid ester of pentaerythritol, polypropylenethioether trithiol, the di-mercaptoacetic ester of pentaerythritol, the polythiol resulting from polybutadiene excess hydrogen sulfide addition, the hexathiol resulting from trivinyl cyclohexane-hydrogen sulfide addition, the trithiol resulting from polypropylene thioether-dithiol-trivinyl cyclohexane addition, etc.

In the case of polythiols the number of allyl isocyanate molecules reacted per molecule of polythiol can equal up to the number of thiol groups in the polythiol. The general reaction is shown by Equation 7.

EQUATION 7

$R'''(SH)_p + q\ CH_2=CHCH_2NCX \rightarrow (HS)_{p-q}R'''$
$(SCH_2CH_2CH_2NCX)_q$ wherein (1) R''' is a polyvalent organic radical containing from 6 to 200 carbon atoms, which radical can be substituted by such atoms as sulfur, oxygen and silicon, illustrative examples of these substituted radicals including polythioether, polyether, and polysilane polythiols, etc.; (2) p and q are 3 to 30, with q being equal to or smaller than p; and (3) X is O or S, preferably O.

Preferred dithiols are polymethylene and polymethylenethioether dithiols each of which can be reacted with allyl isocyante in accordance with Equation 8.

EQUATION 8

$n\ HS+(CH_2)_1\ S+_n\ (CH_2)_1\ SH + n+1$
$CH_2=CHCH_2NCO \rightarrow ONC\ (CH_2)_3S+ (CH_2)_1$
$S+_n(CH_2)_1\ S(CH_2)_3NCO$ wherein 1 is 1 to 12.

A preferred trithiol is the triaddition product of the reaction of polymethylene and polymethylenethioether dithiols with trivinyl cyclohexane, which reaction is shown in Equation 9.

EQUATION 9

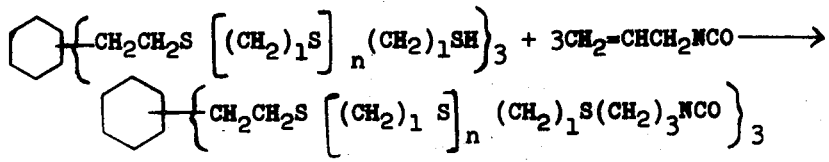

When allylic isocyanates or isothiocyanates of this invention are reacted with polythiols, it is to be understood that the resulting reaction can be either a partial one or can be run until completion.

Without wishing or intending to be bound by any theory, it is nevertheless believed, from the structure of the adducts obtained, that the selective additions of this invention take place by means of a free radical type chain mechanism and in accordance with the following postulated reaction mechanism.

Initiation

initiator

Propagation

Step (1)

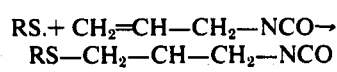

Step (2)

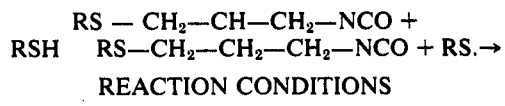

REACTION CONDITIONS

The reaction temperatures employed in this invention are preferably kept below 100°C., most preferably below about 50°C, in order to avoid concurrent ionic reactions of the isocyanate group which result in the formation of by-products. The lower limit of the reaction temperature range is defined by the freezing point of the reaction mixture employed, reaction initiation, and the cost of refrigeration. Reaction temperatures are between about −150° and about +100°C., preferably between about −80° and about +50°C. For the initiation of the low temperature, selective free radical reactions, nonchemical initiators are preferred, such as ultraviolet light, gamma radiation, etc. However, chemical initiators can also be used below the temperature limits of the reactions. For example, chemical initiators such as peroxides, derived from boron alkyls are suitable low temperature initiators. Other chemical initiators include azo compounds, such as bis-azo-i-butyronitrile, etc.

Usually the reactions of this invention are carried out with equivalent amounts of reactants in the liquid phase at atmospheric pressures. If the thiol reactant is gaseous at the reaction temperature, superatmospheric pressure can be used to keep it in the liquid state. Alternatively, such a thiol as, e.g., ethanethiol, can be slowly introduced into the radiated, liquid allylic isocyanate compound. In general, the isocyanate reactants are good solvents for the thiols. Solid thiols can essentially be dissolved in the isocyanate reactants to obtain liquid reaction mixtures. However, the use of nonreactive solvents at times can be desirable. Exemplary of suitable solvents are the open-chain and cyclic hydrocarbons such as heptane, cyclohexane, benzene, xylene, etc.; aliphatic sulfides such as dimethyl sulfide; dialkyl ethers such as diethyl ether; esters such as ethyl acetate; dialkyl sulfones such ad diethyl sulfone; etc.

Although the reactants are usually employed in equivalent amounts, an excess of either reactant beyond the stoichiometric requirements can be used with beneficial results. For example, an excess of methanethiol can be used to increase the rate of the overall addition reaction to allyl isocyanates. Upon completion of the free radical addition, the excess thiol can be removed or used for anionic addition to the isocyanate group to form the corresponding thiourethane in accordance with the following equation, Equation 10.

EQUATION 10

(1) CH$_2$=CH-CH$_2$-NCO $\xrightarrow[\text{excess}]{\text{CH}_3\text{SH}}$ CH$_3$S(CH$_2$)$_3$NCO (2) CH$_3$S(CH$_2$)$_3$NCO $\xrightarrow{\text{CH}_3\text{SH}}$ CH$_3$S(CH$_2$)$_3$NH-C(=O)-SCH$_3$ The dithiol reactants of this invention such as e.g., ethane dithiol, can be reacted with half of the stoichiometric requirements of allyl isocyanate to yield a thiol isocyanate product which is itself subject to polyautoaddition to thereby result in a polyurethane product in accordance with the following equation, Equation 11.

EQUATION 11 n HS(CH$_2$)$_2$SH + n CH$_2$=CHCH$_2$NCO ⟶ n HS(CH$_2$)$_2$S(CH$_2$)$_3$NCO
↓
[S(CH$_2$)$_2$S(CH$_2$)$_3$NH-C(=O)]$_{n-1}$

Alternatively, trithiols such as polythioether trithiols can be reacted with an excess of allyl isocyanate to convert them to the corresponding polythioether triisocyanates. The excess allyl isocyante is then removed by distillation.

In general, the monothiol adducts of this invention are characterized by the formulae:

$$RS - \underset{R_2}{\overset{R_1}{C}} - \underset{H}{\overset{R_3}{C}} - \underset{R_5}{\overset{R_4}{C}} - N=C=X$$

and $$RS - \underset{\underset{R_1\ R_2}{CH}}{\overset{R_3}{C}} - \overset{R_4}{\underset{R_5}{C}} - N=C=X$$

wherein R, R$_1$–R$_5$ and X are as previously defined in Equation 2.

The preferred monothiol adducts of this invention have the formula

RS—CH$_2$—Ch$_2$—CH$_2$—N=C=X

Illustrative nonlimiting examples of R include methyl, octadecyl, t-butyl, phenyl, naphthyl, anthryl, cyclohexyl, 3-chloropropyl, trichlorophenyl, hydroxyethyl, nitroaphthyl, methanesulfonylphenyl, carboethoxymethyl, epoxypropyl, cyanoethyl, acetylphenyl, etc.

The preferred monothiol adducts include ethylthiopropyl isocyanate, ethylthiopropyl isothiocyanate, cyanoethylthiopropyl isothiocyanate, dichloropropylthiopropyl isothiocyanate, hexadecylthiopropyl isothiocyanate, naphthylthiopropyl isothiocyanate, etc.

In general, the dithiol adducts of this invention are characterized by the following formulae:

HS—R'—S(CH$_2$)$_3$NCX;  XCN(CH$_2$)$_3$S—R'—S(CH$_2$)$_3$NCX;
Monoadduct              Diadduct and $$HS-R'\left[S(CH_2)_3NH-\underset{X}{\overset{\|}{C}}-S-R'\right]_n S(CH_2)_3NCX$$

Polyadduct wherein R', X, and n are as previously defined in Equations 3 and 4.

Illustrative, nonlimiting examples of R' include propylene, trimethylene, ethylene, xylylene, phenylene, polyethylene thioether, polypropylenethioether, polyethyleneoxide, polyethylenedimethylsilane, polyethylenesulfone, polydodecamethylenethioether, etc.

In general, the trithiol adducts of this invention are characterized by the following formula:

R''(SCH$_2$CH$_2$CH$_2$NCX)$_3$ wherein R'' is as previously defined in Equation 6.

The polythiol adducts of this invention are generally described by the following formula:

(HS)$_{p-q}$ R''' (SCH$_2$CH$_2$CH$_2$NCX)$_q$ wherein R''', p, q, and X are as previously defined in Equation 7.

The anti-Markovnikov adducts of this invention are valuable intermediates which can themselves undergo all the customary reactions undergone by isocyanates and isothiocyanates in general with such typical reactants as alcohols, thiols, acids, amines, oximes, water, etc. Moreover, the products derived from the reaction of dithiols, and polythiols with allylic isocyanates are especially useful in polymer chemistry as monomers and cross-linking agents.

The diisocyanate, triisocyanate and polyisocyanate containing adducts of di-, tri-, and polythiols are mainly utilized in polymer chemistry as monomer components with diols, triols, polyols and diamines, triamines, polyamines, and water. Their reaction as monomer components leads to polyurethanes and polyureas. Difunctional diisocyanates when reacted with diols and diamines yield linear polymers. Polyfunctional isocyanates are useful as crosslinking agents.

As previously noted, the anti-Markovnikov adducts of this invention are also useful as pesticides, particularly as post-emergence herbicides. For pesticidal uses it is preferable that the adduct be derived from a mono or dithiol. As the other component an allylic isothiocyanate is preferred. It is furthermore preferred that the pesticidal adduct should have a molecular weight of less than 500. The dithiol used in the preparation of pesticides is preferably a $C_1$ to $C_4$ polymethylene dithiol.

When used as post-emergence herbicides, the biologically active ingredients are preferably formulated with a suitable carrier or diluent or combinations thereof.

The term "carrier" or "diluent" as used herein means a material, which can be inorganic or organic and synthetic or of natural origin, with which the active ingredient of this invention can be mixed or formulated to facilitate its storage, transportation and handling, and application to the plants, e.g., weeds, to be treated. The carrier is preferably biologically and chemically inert and, as used, can be a solid or a fluid. When solid carriers are used, they are preferably particulate, granular, or pelleted; however, other shapes and sizes of solid carriers can be employed as well. Such preferably solid carriers can be naturally occurring minerals— although subsequently subjected to sieving, sieving purificaation, and/or other treatments, including for example, gypsum; tripolyte; diatomaceous earth; mineral silicates such as mica, vermiculite, talc, and pyrophyllite; clays of the montmorillonite; kaolinite, or attapulgite groups; calcium or magnesium limes; or calcite and dolomite etc. Carriers produced synthetically, as for example, synthetic hydrous silica oxides and synthetic silicates can also be used, and many proprietary products of this type are available commercially. The carrier can also be an elemental substance such as sulfur or carbon, preferably an activated carbon. If the carrier possesses intrinsic catalytic activity such that it would decompose the active ingredient, it is advantageous to incorporate a stabilizing agent, as for example, polyglycols such as diethylene glycol to neutralize this activity and thereby prevent possible decomposition of the active and anti-Markovnikov ingredient.

For some purposes, a resinous or waxy carrier can be used, preferably one which is solvent soluble or thermoplastic, including fusible. Examples of such carriers are natural or synthetic resins such as coumarin, resin, rosin, copal, shellac, dammar, polyvinyl chloride, styrene polymers and copolymers, a solid grade of polychlorophenol such as is available under the registered trademark "Arochlor," a bitumen, an asphalite; a wax, for example, beeswax, or a mineral wax such as a paraffin wax or Montan wax, or a chlorinated mineral wax, or a micro-crystalline wax such as those available under the registered trademark "Mikrovan wax." Compositions comprising said resinous or waxy carriers are preferably in granular or pelleted form.

Fluid carriers can be liquids, as for example, water, or an organic fluid, including a liquefied normally vaporous or gaseous material, and can be solvents or non-solvents for the active material. For example, the horticultural petroleum spray oils boiling in the range of from about 275° to about 575°F., or boiling in the range of from about 575° to about 1,000°F. and having an unsulfonatable residue of at least about 75 percent and preferably of at least about 90 percent, or mixtures of these two types of oils are particularly suitable liquid carriers.

The carrier can be mixed or formulated with the active material during its manufacture or at any stage subsequently. The carrier can be mixed or formulated with the active material in any proportion depending upon the nature of the carrier. One or more carriers, moreover, can be used in combination.

The compositions of this invention can be concentrated, suitable for storage and transport and contain, for example, from about 5 to about 95 percent by weight of the active ingredient, preferably from about 20 to about 80 weight percent. These concentrates can be diluted with the same or a different carrier to a concentration suitable for application. The compositions of this invention can also be dilute compositions suitable for application. In general, concentrations of about 0.1 to about 10 percent by weight of the active material based on the total weight of the composition, are satisfactory, although lower and higher concentrations can be applied if necessary.

The compositions of this invention can also be formulated as dusts. These comprise an admixture of the active ingredient and a finely powdered solid carrier such as aforedescribed. The powdered carriers can be oil-treated to improve adhesion to the surface to which they are applied. These dusts can be concentrates, in which case a highly sorptive carrier is preferably used. These require dilution with the same or a different finely powdered carrier, which can be of lower sorptive capacity to a concentration suitable for application.

The compositions of this invention can also be formulated as wettable powders comprising a major proportion of the active ingredient mixed with a dispersant, i.e., a deflocculating or suspending agent, and, if desired, a finely divided solid carrier and/or a wetting agent. The active ingredient can te in particulate form or adsorbed on the carrier and preferably constitutes at least about 10 percent, more preferably at least about 35 percent by weight of the final pesticidal composition. The concentration of the dispersing agent should in general be between about 0.5 and about 5 percent by weight of the total composition, although larger or smaller amounts can be used if desired.

The dispersing agent used in the composition of this invention can be any substance having definite dispersant, i.e., deflocculating or suspending properties as distinct from wetting properties, although these substances can also possess wetting properties as well.

The dispersant or dispersing agent used can be protective colloids such as gelatin, glue, casein, gums, or a synthetic polymeric material such as polyvinyl alcohol and methyl cellulose, etc. Preferably, however, the dispersants or dispersing agents used are sodium or calcium salts of high molecular weight sulfonic acids, as for example, the sodium or calcium salts of lignin derived from sulfite cellulose waste liquors. The calcium or sodium salts of condensed aryl sulfonic acids, for example, the products known as 37 Tamol 731," are also suitable.

The wetting agents used can be nonionic type surfactants, as for example, the condensation products of fatty acids containing at least 12, preferably 16 to 20, carbon atoms in the molecule, or abietic acid or napthenic acid obtained in the refining of petroleum oil fractions with alkylene oxides such as ethylene oxides or propylene oxides, or with both ethylene oxides or propylene oxides, as, for example, the condensation product of oleic acid and ethylene oxide containing about 6 to 15 ethylene oxide units in the molecule. Other nonionic wetting agents like polyalkylene oxide polymers, commercially known as "Pluronics" can be used. Partial esters of the above acids with polyhydric alcohols such as glycerol, polyglycerol, sorbitol, mannitol, etc., can also be used.

Suitable anionic wetting agents include the alkali metal salts, preferably sodium salts of sulfuric acid esters or sulfonic acids containing at least 10 carbon atoms in a molecule, for example, the sodium secondary alkyl sulfates, dialkyl sodium sulfosuccinates available under the registered trademark "Teepol," sodium salts of sulfonated castor oil, sodium dodecyl benzene sulfonate, etc.

Granulated or pelleted compositions comprising a suitable carrier having the active ingredient incorporated therein are also included in this invention. These can be prepared by impregnating a granular carrier with a solution of an active ingredient or by granulating a mixture of a finely divided carrier and the active ingredient. The carrier used can contain a fertilizer or a fertilizer mixture, such as, for example, a super phosphate.

The compositions of this invention can also be formulated as solutions of the active ingredient in an organic solvent or mixture of solvents, such as, for example, alcohols; ketones, especially acetones; ethers; hydrocarbons; etc.

Where the toxicant itself is a liquid these materials can be sprayed upon crops without further dilution.

Petroleum hydrocarbon fractions used as solvents should preferably have a flash point about 73°F., an example of this being a refined aromatic extract of kerosene. Auxiliary solvents such as alcohols, ketones, and polyalkylene glycol ethers and esters can be used in conjunction with these petroleum solvents.

Compositions of the present invention can also be formulated as emulsifiable concentrates which are concentrated solutions or dispersions of the active ingredient in an organic liquid, preferably a water-insoluble organic liquid containing an added emulsifying agent. These concentrates can also contain a proportion of water, for example, 50 percent by volume, based upon the total composition to facilitate the solution with water. Suitable organic liquids include, e.g., the above petroleum hydrocarbon fractions previously described.

The emulsifying agents can be of the type producing water-in-oil type emulsions which are suitable for application by low volume spraying, or an emulsifier of the type producing oil-in-water emulsions. Oil-in-water emulsions can be used, producing concentrates which can be diluted with relatively large volumes of water for application by high volume spraying or relatively small volumes of water for low volume spraying. In such emulsions, the active ingredient is preferably in a non-aqueous-phase.

The present invention is further illustrated in further detail by following examples, but it is to be understood that the present invention, in its broadest aspects, is not necessarily limited in terms of the reactants or specific temperatures, residence times, separation techniques, and other process conditions, etc.; or dosage levels, exposure times, test plants used, etc., by which the compounds and/or formulations described and claimed are preferred and/or used.

EXAMPLE 1

Ultraviolet Light-Initiated Addition of Methanethiol to Allyl Isocyanate

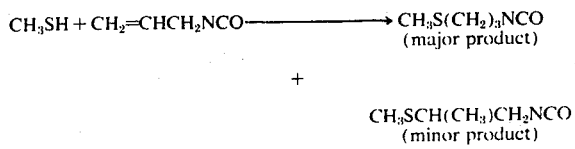

Into a quartz pressure tube equipped with a magnetic stirrer and a Teflon screw valve, 49.8 grams (0.6 mole) of allyl isocyanate was placed. Then, 38.4 grams (0.8 mole) of methanethiol was condensed to it, using a dry ice bath. The tube containing the reaction mixture was placed into a water bath, thermostated at 15°C., and mounted upon a magnetic stirrer drive. The stirred reaction mixture was then irradiated from a distance of 5 centimeters by a 75 watt Hanau ultraviolet immersion lamp having a high pressure mercury arc emitting a wide spectrum radiation.

The reaction mixture was sampled during the irradiation to determine the progress of the addition. Nuclear magnetic resonance spectroscopy (nmr) was found to be suitable, semiquantitative tool for the analysis of the samples. It showed that 80 percent of the allyl isocyanate reacted in the first ½-hour irradiation time. A total of 3 hours ultraviolet irradiation resluted in more than 95 percent conversion of the isocyanate. Nmr also showed that all the addition took place at the olefinic bond. It could also be determined by nmr that 90 percent of the addition took place in an anti-Markovnikov manner to yield 3-methylthiopropyl isocyanate. About 10 percent of the adduct was of the opposite orientation, i.e., 2-methylthiopropyl isocyanate. The absence of ionic thiourethane adducts indicated that both adducts were formed by a selective, free radical mechanism.

Distillation of the reaction mixture in vacuo yielded 71.5 grams (91 percent) of the isomeric adduct mixtures as a clear, colorless, mobile liquid, boiling at 33°–35°C. at 0.2 mm pressure. A fractional distillation resulted in an enrichment of the branched adduct isomer in the early fractions.

Elemental Analysis — Calculated for $C_5H_9NOS$: C, 45.78; H, 6.91; S, 24.44; N, 10.67. Found: C, 45.52; H, 7.05; S, 24.38; N, 10.66.

EXAMPLE 2

Gamma Irradiation-Initiated Addition of Methanethiol to Allyl Isothiocyanate

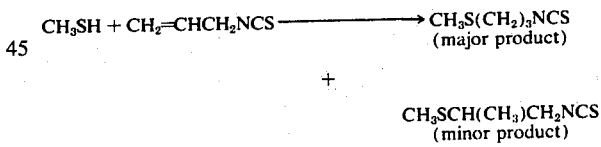

A mixture of 69.3 grams (0.7 mole) of distilled allyl isothiocyanate and 32.4 grams (0.675 mole) of methanethiol was reacted in a Pyrex pressure tube under the effect of gamma irradiation. The reaction was initiated from 10 cm distance with 4 $Co^{60}$ plates emitting about 4,500 curies. Five hours irradiation resulted in about 40 percent conversion of the methanethiol to yield the allylic adducts. About 90 percent of the isomeric adducts was 3-methylthiopropyl isothiocyanate, while 10 percent was the branched 2-methylthiopropyl isothiocyanate.

The crude reaction product was distilled in vacuo to yield the isomeric mixture as a clear, light yellow liquid boiling at 76°–78°C. at 0.6 mm pressure.

Elemental Analysis — Calculated for the distillate, $C_5H_9NS_2$: C, 40.78; H, 6.16; S, 43.55. Found: C, 40.38, H, 6.34; and S, 43.57.

A reaction of equimolar amounts of reactants under the above conditions resulted in 53 percent conversion in 16 hours. The isomeric adduct mixture consisted of about 91 percent 3-methylthiopropyl isothiocyanate and 9 percent 2-methylthiopropyl isothiocyanate.

EXAMPLE 3

Ultraviolet Light-Initiated Addition of Methanethiol to Allyl Iosthiocyanate.

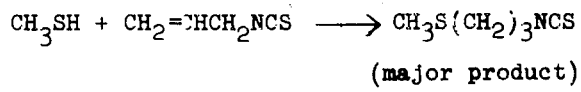

(major product)

+

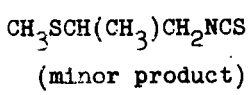

(minor product)

+

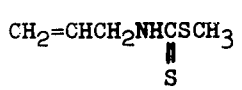
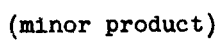

(minor product)

A mixture of 69.3 grams (0.7 mole) of distilled allyl isothiocyanate and 33.6 grams (0.7 mole) of methanethiol was irradiated with two 75 watt Hanau immersion lamps for 127 hours at 16°C., resulting in 90 percent reaction of the methanethiol. An nmr spectrum of the crude reaction mixture indicated that 80 percent of the adduct was 3-methylthiopropyl isothiocyanate. Eleven percent was the branched adduct, 2-methylthiopropyl isothiocyanate. About 9 percent of the adduct was N-allyl-S-methyldithiocarbamate, which resulted by the addition of the thiol to the isothiocyanate group.

Distillation of the crude reaction product in vacuo yielded a mixture of the 3- and 2-methylthiopropyl isothiocyanate as a liquid distillate identical with the product of the previous example.

EXAMPLE 4

Ultraviolet Light-Initiated Addition of 2-Propanethiol to Allyl Isothiocyanate

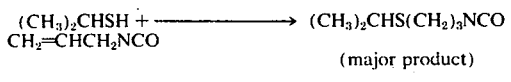

(major product)

+

(minor product)

A mixture of 80.7 g (0.97 mole) of distilled allyl isocyanate and 73.9 g (0.97 mole) 2-propanethiol was irradiated with two Hanau lamps as described in the previous example. Nmr indicated that 5 hours of irradiation resulted in 79 percent, and 24 hours of total irradiation in 93 percent, reaction of the allyl isocyanate. After the removal of the unreacted volatile components of the mixture under 0.1 mm pressure, it could be estimated by nmr that the residue consisted of 95 percent 3-i-propylthiopropyl isocyanate and 5 percent 2-i-propylthiopropyl isocyanate.

Distillation of the crude residual product at 0.05 mm pressure yielded 140 g of the clear colorless liquid product boiling between 34°–36°C. Based on the reacted amounts of starting materials, this amount corresponds to an isolated yield of 97 percent for the isomeric mixture of olefinic adducts.

Elemental Analysis — Calculated for $C_7H_{13}OSN$: C, 52.80; H, 8.22; N, 8.79; S, 20.14. Found: C, 52.52; H, 8.28; N, 8.93; S, 19.81.

EXAMPLE 5

Ultraviolet Light-Initiated Addition of 2-Methyl-2-Propanethiol to Allyl Isocyanate $$(CH_3)_3CSH + CH_2=CHCH_2NCO$$
$$\longrightarrow (CH_3)_3CS(CH_2)_3NCO$$

A mixture of 84.2 g (1.01 mole) of distilled allyl isocyanate and 89.3 g (0.99 mole) of 2-methyl-2-propanethiol was irradiated as described in the previous example. Nmr spectroscopy of samples, taken at periodic intervals from the reaction mixture, indicated allyl isocyanate conversions of 64 percent after 4 hours and of 93 percent after 64 hours irradiation. After the removal of the volatile reactants in vacuo, nmr analysis of the crude reaction product indicated that it was mostly 3-t-butylthiopropyl isocyanate.

Distillation of the crude product at 0.05 mm yielded 152 g of the clear, colorless liquid boiling between 37°–39°C. This represents a 95 percent yield based on the converted reactants. Nmr indicates a 95 percent minimum of the major isomeric adduct.

Elemental Analysis — Calculated for $C_8H_{15}OSN$: C, 55.46; H, 8.72; N, 8.08; S, 18.5. Found: C, 55.31; H, 8.81; N, 8.08; S, 18.48.

EXAMPLE 6

Ultraviolet Light-Initiated Addition of Benzenethiol to Allyl Isocyanate

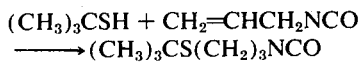

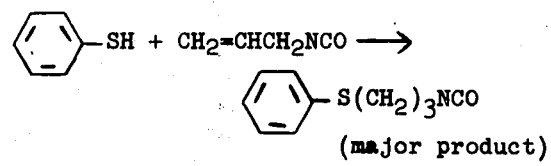

(major product)

+

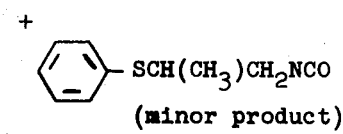

(minor product)

+

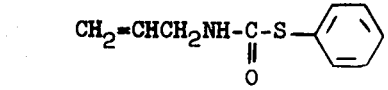

A stirred mixture of 55 grams (0.5 mole) of benzenethiol and 43.6 grams (0.525 mole) of allyl isocyanate was irradiated in a quartz reaction vessel with a 75 watt Hanau immersion lamp at 15°C. Four hours irradiation resulted in about 50 percent conversion of the isocyanate as indicated by nmr. A total of 24 hours irradiation resulted in about 75 percent conversion to the two isomeric adducts resulting by addition to the olefinic bond. Nmr of the reaction mixture also indicated that the relative percentages of the adducts were 93 percent 3-phenylthiopropyl isocyanate and 7 percent 2-phenylthiopropyl isocyanate.

Fractional distillation of the mixture in vacuo yielded 55 grams (57.5 percent) of the isomeric adducts as a clear, colorless, mobile liquid boiling at 87°–90°C. at 0.1 mm. It was observed during distillation that the heating caused some reaction of the thiol with the isocyanate group.

Elemental Analysis: Calculated for $C_{10}H_{11}ONS$: C, 62.15; H, 5.73; N, 7.25; S, 16.59. Found: C, 62.28; H, 5.89; N, 7.19; and S, 16.74.

EXAMPLE 7

Gamma Irradiation-Initiated Addition of Benzenethiol to Allyl Isothiocyanate

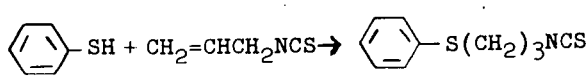

(olefinic product)

+

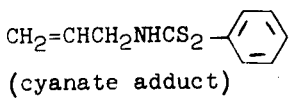

(cyanate adduct)

+

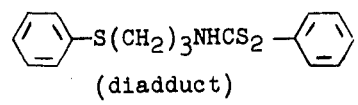

(diadduct)

A mixture of 89 grams (0.9 mole) allyl isothiocyanate and 99.25 grams (0.9 mole) benzenethiol was irradiated by gamma rays in the manner described in Example 2. Nmr analysis of a sample after 19 hours irradiation indicated the formation of 19 percent olefinic adduct. A total of 89 hours irradiation and 120 hours standing without irradiation resulted in the formation of byproducts, i.e. diadduct and cyanate adduct as indicated by nmr.

An attempted distillation of the reaction mixture at 0.1 mm pressure from a bath of 135°C. resulted in the decomposition of the by-products according to the following reaction schemes:

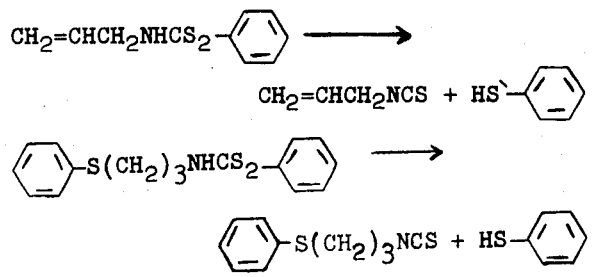

The volatile decomposition products were removed by distillation. Nmr indicated that the residual product (65 g) was mostly the olefinic adduct, i.e., 3-phenylthiopropyl isothiocyanate. Based on the amount of starting materials this corresponds to a yield of 35 percent.

Elemental Analysis — Calculated for $C_{10}H_{11}S_2N$: C, 57.38; H, 5.28; N, 6.69; S, 30.64. Found: C, 57.11; H, 5.46; N, 7.04; S, 30.45.

EXAMPLE 8

Ultraviolet Light-Initiated Addition of Ethanedithiol to Allyl Isocyanate

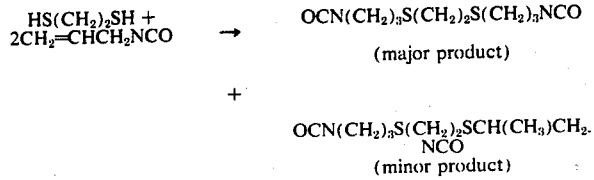

A stirred mixture of 94 grams (1.0 mole) of ethanedithiol at 182.6 grams (2.2 mole) of allyl isocyanate was irradiated in a quartz tube at 15°C. by a 75 watt Hanau ultraviolet immersion lamp. One hour irradiation resulted in the conversion of 55 percent of the isocyanate. A total of 5 hours irradiation converted about 85 percent of the isocyanate. Removal of the excess allyl isocyanate by distillation gave a quantitative yield of a crude, residual product having an nmr spectrum corresponding to that of a mixture containing 92 percent of straight diadduct, ethylene-bis-3-thiopropyl isocyanate, and 8 percent of the corresponding partially branched diadduct.

Distillation of the crude product in vacuo yielded 161.2 grams (62 percent) of the diadduct as a colorless, clear liquid, distilling at 147°–150°C. at 0.2 mm pressure. Nmr indicated that the rest of the product, which was a brown residue, also consisted mainly of the same diadduct.

Elemental Analysis — Calculated for $C_{10}H_{16}N_2O_2S_2$: C, 46.13; H, 6.19; N, 10.76; and S, 24.63. Found: C, 46.39; H, 6.32; N, 10.62; and S, 24.56.

EXAMPLE 9

Ultraviolet Light-Initiated Addition of Ethanedithiol to Allyl Isothiocyanate

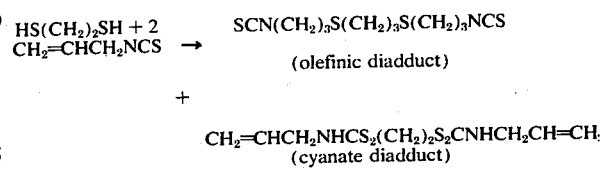

A mixture of 29.7 grams (0.3 mole) of allyl isothiocyanate and 14.1 grams (0.15 mole) of ethanedithiol was irradiated in the manner described in the previous example. Nmr showed that 120 hours irradiation resulted in the reaction of 45 percent of the allylic double bonds to form the corresponding allylic adducts. About 22 percent of the thiocyanate groups also reacted to form the cyanate adducts.

EXAMPLE 10

Gamma Irradiation-Initiated Addition of Ethanedithiol to Allyl Isothiocyanate

A mixture of 99 grams (1 mole) of allyl isothiocyanate and 47 grams (0.5 mole) of ethanedithiol was reacted with initiation from a gamma ray source as described in Example 2. Nmr indicated that 22 hours radiation resulted in 32 percent reaction of the allylic group. Subsequent irradiation for 70 hours plus 8 days standing resulted in a final reaction mixture, in which 57 percent of the allylic and 18 percent of the isocyanate double bonds were reacted.

An attempted distillation of the reaction mixture from a bath at 135°C. at 0.2 mm pressure resulted in the decomposition of the dithiocarbamate groups formed by isothiocyanate addition. For example, the decomposition of the isothiocyanate diadduct can be indicated by the following scheme:

$CH_2=CHCH_2NHCS_2CH_2CH_2S_2CNHCH_2CH=CH_2 \rightarrow$
$2\ CH_2=CH_2NCS + HSCH_2CH_2SH$ The volatile decomposition products were removed by distillation. An nmr spectrum of the residual product (120 g) indicated that it was mostly the olefinic diadduct, i.e. 3-(ethylene)-bis-thiopropyl isothiocyanate. Based on the amount of starting materials, the residual adduct was obtained in a yield of 82 percent.

EXAMPLE 11

Ultraviolet Light-Initiated Addition of Ethyl Mercaptoacetate to Allyl Isocyanate

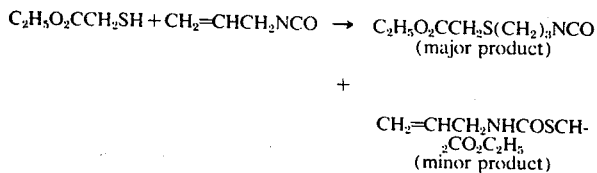

A mixture of 83 grams (1 mole) of allyl isocyanate and 120 grams (1 mole) of ethyl mercaptoacetate was irradiated by two ultraviolet lamps as described in Example 1. Nmr analysis showed that most of the thio reacted in an hour. About 75 percent thiol addition occurred to the allylic double bond. To complete the reaction, the reaction mixture was irradiated for 14 more hours. The volatile components of the mixture were then removed at 0.05 mm. As a residual product, 190 grams (93 percent) of crude adduct was obtained. Nmr indicated that it contained 80 percent of the major product, i.e. 3-carboethoxymethylthiopropyl isocyanate and about 15 percent of the minor product, i.e. ethyl S-(N-allyl)-carbamoyl thiolacetate.

An attempted distillation of the crude adduct yielded some 3-carboethoxymethylthiopropyl, isocyanate, as a clear colorless liquid distilling at 97°c. under 0.5 mm pressure with decomposition.

Elemental Analysis — Calculated for $C_8H_{13}NO_3S$: C, 47.28; H, 6.44; N, 6.89; S, 15.77. Found: C, 47.05; H, 6.46; N, 6.75; S, 15.63.

EXAMPLE 12

Ultraviolet Light-Initiated Addition of p-Chlorobenzenethiol to Allyl Isocyanate A solution of 41.5 grams (0.5 mole) of allyl isocyanate and 72.25 grams (0.5 mole) of p-chlorobenzenethiol in 50 ml dimethyl sulfide was irradiated with an ultraviolet lamp in the manner described in Example 1. Nmr indicated that in 48 hours 32 percent of the allylic double bonds reacted with the thiol to form the allylic monoadduct, i.e. 3-p-chlorophenylthiopropyl isocyanate. No other products could be observed.

An attempt to fractionally distill the reaction mixture at 0.1 mm from a 160°C. bath resulted in the formation of the diadduct as a residual product.

EXAMPLE 13

Gamma Irradiation-Initiated Addition of Polythioether Dithiol to Allyl Isocyanate

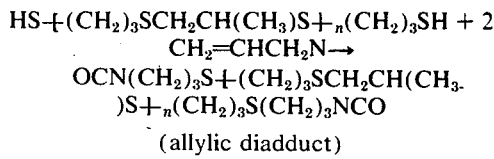

A magnetically stirred mixture of 20 grams (0.24 mole) of allyl isocyanate and 110 grams (0.1 mole) of polythioether (PTE) dithiol of the above formula was irradiated with gamma rays for 16 hours in the manner described in Example 3. The crude reaction product was then heated at 130°C. for 2 hours under 0.05 mm to remove the excess allyl isocyanate. A study of the nmr spectrum of the residual product indicated that a complete and selective addition of the PTE dithiol to form the allylic diadduct took place. A number average molecular weight determination of the product in benzene solution by a vapor pressure osmometer gave a value of 1,268. The calculated molecular weight of the diadduct is 1,266.

Elemental Analysis — Calculated for $C_{47}H_{94}N_2O_2S_{14}$ (diadduct of 1,168 molecular weight): C, 48.33; H, 8.12; N, 2.39; S, 38.43; Found: C, 48.13; H, 8.02; N, 2.40; S, 38.90.

EXAMPLE 14

Ultraviolet Light-Catalyzed Addition of Allyl Isocyanate to Polythioether Tetrathiol

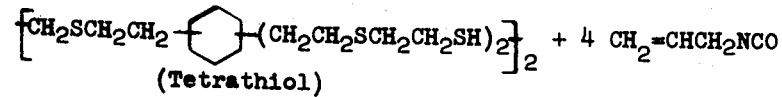

Molecular Weight Calculated 795.5. Found 897
Number of SH Groups per Molecule Calculated 4.0. Found 4.4

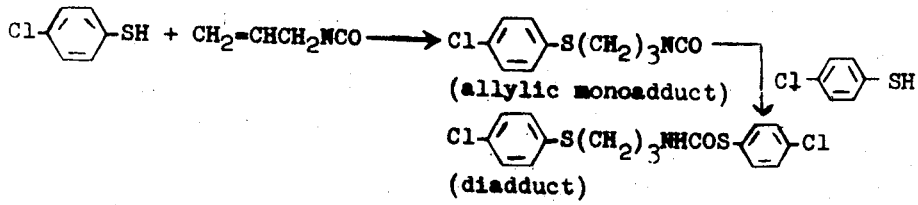

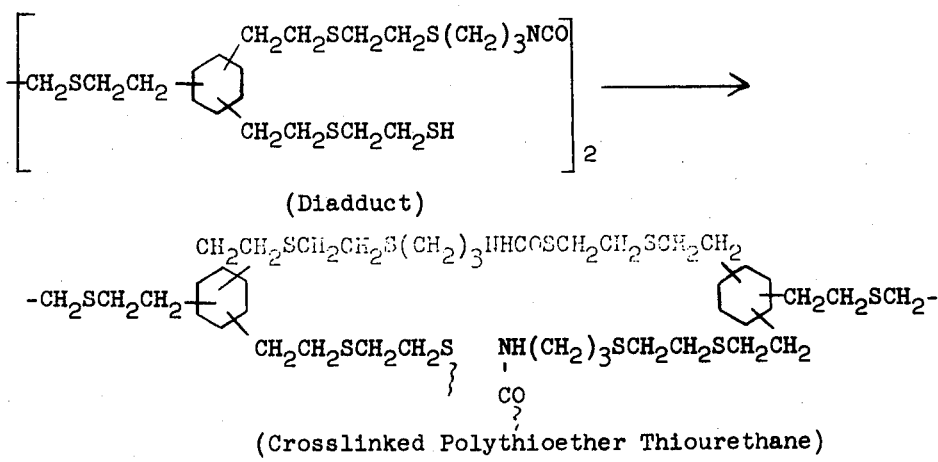

(Diadduct)

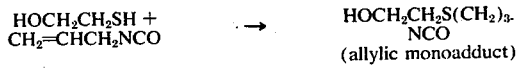
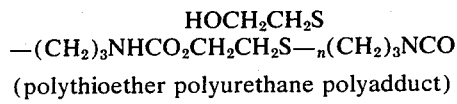

(Crosslinked Polythioether Thiourethane)

A magnetically stirred mixture of 32.12 grams (0.39 mole) of allyl isocyanate and 80.7 grams (0.09 mole) of liquid polythioether (PTE) tetrathiol, derived from the addition of ethanedithiol to 1,2,4-trivinyl cyclohexane, was irradiated with an ultraviolet lamp in the manner described in Example 3. The progress of the allylic addition reaction was followed by nmr spectroscopy. In 28 hours, 69 percent of the allyl isocyanate reacted. A liquid product mixture consisting of a major amount of triadduct and a minor amount of diadduct was formed. The unreacted allyl isocyanate was removed from this mixture at 0.2 mm at room temperature. Subsequent heating of the liquid residual product at 135°C. for 2 hours resulted in crosslinking. This is due to a thermally induced ionic reaction of the thiol groups with the isocyanate groups to form thiourethane bonds. The crosslinked product is a very tough, hard polymer insoluble in benzene.

EXAMPLE 15

Ultraviolet Light-Initiated Addition of
β-Hydroxyethanethiol to Allyl Isocyanate HOCH$_2$CH$_2$SH +    →    HOCH$_2$CH$_2$S(CH$_2$)$_3$-
CH$_2$=CHCH$_2$NCO            NCO
                              (allylic monoadduct)

HOCH$_2$CH$_2$S
—(CH$_2$)$_3$NHCO$_2$CH$_2$CH$_2$S—$_n$(CH$_2$)$_3$NCO (polythioether polyurethane polyadduct)

A mixture of 91.3 grams (1.1 mole) of allyl isocyanate and 78 grams (1 mole) of hydroxyethanethiol was irradiated with an ultraviolet lamp in the manner described in Example 1 for 100 minutes. Nmr spectroscopy indicated that allylic monoaddition took place with a reactant conversion of 95 percent. The unreacted volatile components of the mixture were removed under diffusion pump vacuum at 1.5 × 10$^{-3}$ mm. The resulting residual product is 3-βhydroxyethylthiopropyl isocyanate, a clear, colorless, mobile liquid. During 72 hours standing at room temperature, it was converted into a linear polythioether polythiourethane of 7589 number average molecular weight by self-polyaddition.

Elemental Analysis — Calculated for C$_6$H$_{11}$NOS: C, 49.63; H, 7.63; N, 9.64; S, 22.08. Found: C, 49.75; H, 7.48; N, 8.78; S, 21.68.

EXAMPLE 16

Ionic Addition of Thiolacetic Acid to Allyl Isocyanate

CH$_3$COSH +           CH$_2$=CHCH$_2$NHCOS-
CH$_2$=CHCH$_2$NCO    →    COCH$_3$
                         (cyanate adduct)

To 43.6 grams (0.525 mole) of stirred allyl isocyanate 38 grams (0.5 mole) of thiolacetic acid was added dropwise below 33°C. in 15 minutes. An exothermic reaction started immediately with the addition of the acid, which required icewater cooling during the addition. The excess allyl isocyanate was subsequently removed at 0.25 mm overnight. The nmr spectrum of the liquid, residual product showed that a quantitative yield of the ionic adduct derived by addition to the isocyanate group was obtained.

EXAMPLE 17

Ultraviolet Light-Catalyzed Addition of
n-Dodecanethiol to Allyl Isocyanate

CH$_3$(CH$_2$)$_{11}$SH +    →    CH$_3$(CH$_2$)$_{11}$S(CH$_2$)$_3$NCO
CH$_2$=CHCH$_2$NCO                (olefinic adduct)

A mixture of 16.6 grams (0.2 mole) of allyl isocyanate and 40.4 grams (0.2 mole) of n-dodecanethiol is irradiated by an ultraviolet lamp in the manner described in Example 1 for 24 hours. An nmr spectrum of the resulting reaction product shows that it is mostly the straight chain olefinic adduct, i.e. 3-n-dodecyl thiopropyl isocyanate.

EXAMPLE 18

Ultraviolet Light-Catalyzed Addition of Ethanethiol to
Allyl Isocyanate

C$_2$H$_5$SH + CH$_2$=CHCH$_2$NCO    →    C$_2$H$_5$S(CH$_2$)$_3$NCO
                                          (olefinic adduct)

A mixture of 16.6 grams (0.2 mole) of allyl isocyanate and 12.4 grams (0.2 mole) of ethanethiol is irradiated at −30°C. for 24 hours in the manner described in Example 1 to yield the olefinic adduct, i.e. 3-ethylthiopropyl isocyanate as the major product.

EXAMPLE 19

Ultraviolet Light-Catalyzed Addition of Xylenethiol to
2-Methallyl Isocyanate

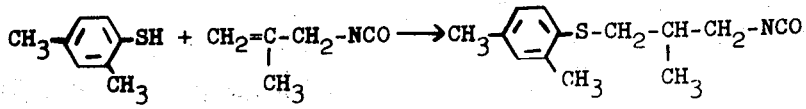

A mixture of 27.6 grams (0.2 mole) of xylenethiol and 16.6 grams (0.2 mole) of 2-methallyl isocyanate is irradiated as described in Example 1 for 24 hours. An examination of the reaction mixture by nmr shows that the methallylic adduct, i.e. 3-xylylthiopropyl isocyanate, is formed.

EXAMPLE 20

Azo-bis-Isobutyronitrile Catalyzed Addition of Methanethiol to Allyl Isothiocyanate A magnetically stirred mixture of 29.7 grams (0.3 mole) of allyl isothiocyanate, 15.4 grams (0.31 mole) of methanethiol and 3.3 grams (0.02 mole) of azo-bis-isobutyronitrile was heated for 24 hours at 40°C. A subsequent examination of the reaction mixture showed that a free radical addition to form 3-methylthiopropyl isocyanate occurred with 30 percent conversion. In 96 houurs the conversion was 70 percent.

EXAMPLE 21

Thiol-Allylic Isocyanate and Isothiocyanate Adducts as Post-Emergence Herbicides A number of the adducts from those prepared in the previous examples were evaluated for post-emergence herbicidal activity in this example. The test procedure employed was as follows:

Appropriate crop plant and weed species were seeded by growth-time requirement schedules in individual disposable four-inch square containers, watered as required, and maintained under greenhouse conditions. When all crop plants and weeds had reached suitable growth development, generally first true leaf stage, plants and weeds appropriate to pertaining test requirements were selected for uniformity of growth and development. One four-inch container of each plant and weed, averaging six (Corn) to fifty (Crabgrass) or more plants or weeds per individual container, was then placed on carrying tray for treatment. Generally, six crop and six weed containers were used in each evaluation.

Candidate compounds were dissolved in acetone and, as appropriate, diluted in water containing wetting and emulsifying agents. Although isocyanates can react with water the results were not significantly influenced when, instead of the acetone solutions, aqueous emulsions were used for spraying the containers.

The application rate was ten pounds per acre and, as "controls," allyl isocyanate and the sodium salt of 2,4-dichlorophenoxy acetic acid were used at the 10- and 2-pounds per acre rate, respectively. The results are given in Table I below, and show that the adducts of this invention are effective post-emergence herbicides. While not wishing or intending to be bound by any theory, it is, nevertheless, believed that, or acceptable biological activity, the presence of both the thioether and the isocyanate groups is necessary; allyl isocyanate shows little activity. It is to be further noted that the isothiocyanate adduct of methanethiol is more active than the corresponding isocyanate adduct and that the aromatic thioether isocyanates seem to be preferable to the corresponding aliphatic thioethers.

TABLE I

POSTEMERGENCE HERBICIDAL ACTIVITY OF ISOCYANATES AND ISOTHIOCYANATES

| Example No. | Chemical Structure | Rate Lbs./Acre | Injury to Crops[a] | | | | | | Injury to Weeds[a] | | | | | Overall Response[a] | |
| --- | --- | --- | --- | --- | --- | --- | --- | --- | --- | --- | --- | --- | --- | --- | --- |
| | | | Sugar Beets | Corn | Oats | Clover | Soy Beans | Cotton | Mustard | Yellow Foxtail | Barn-yard Grass | Crab Grass | Buck-wheat | Morning Glory | Crop Index | Feed Index |
| 1 | $CH_3SCH_2CH_2NCS$ | 10 | 8 C | 6 C | 3 C | 10 C | 9 C | 10 C | 9 C | 10 C | 10 C | 10 C | 3 C | 10 C | 7.6 | 8.6 |
| 2 | $CH_3SCH_2CH_2NCO$ | 10 | 5 C | 3 C | 3 C | 9 C | 9 C | 8 C | 7 C | 6 C | 5 C | 10 C | 6 C | 5 C | 6.1 | 6.5 |
| 6 | ⟨⟩-$SCH_2CH_2NCO$ | 10 | 9 C | 7 C | 7 C | 10 C | 9 C | 10 C | 10 C | 10 C | 10 C | 10 C | 10 C | 10 C | 8.6 | 10.0 |
| 8 | $[CH_2SCH_2CH_2CH_2NCO]_2$ | 10 | 0 - | 6 C | 7 C | 6 C | 6 C | 4 C | 9 C | 10 C | 8 C | 10 C | 10 C | 8 C | 4.8 | 9.1 |
| Control | $CH_2=CHCH_2NCO$ | 10 | 2 C | 0 - | 0 - | 3 - | 5 - | 0 - | 3 C | 2 C | 3 C | 5 C | 0 - | 0 - | 1.6 | 2.1 |
| Control | Cl-⟨⟩-$OCH_2CO_2Na$ (Cl) | 2 | 10 D | 0 - | 0 - | 10 D | 8 D | 9 C | 10 C | 0 - | 0 - | 0 - | 10 D | 10 D | 6.1 | 5.0 |

(a) 0: No visible effect. 1-3: Slight injury; plant usually recovered with little or no reduction in top growth. 4-6: Moderate injury; plants usually recovered but with reduced top growth. 7-9: Severe injury; plants usually did not recover. 10: All plants killed. C: Caustic. D: Distorted.

EXAMPLE 22

Pesticidal Spectrum of 3-Methylthiopropyl Isothiocyanate

3-Methylthiopropyl isothiocyanate, the product of Example 2, was examined in various standard pesticidal screening tests for its pesticidal activity.

An aqueous emulsion containing 0.05 percent of the active chemical was found to kill, as a systemic poison, pea asphids.

When applied as an acetone solution at a rate of 100 lbs. active material per four-inch deep acre, the chemical completely controlled the root knot nematode on tomatoes.

When tested as a foliar fungicide on 6–8 inch high wheat plants, an acetone solution containing 0.5 percent of the chemical completely protected the plants against the cereal leaf rust, Puccinia recondita.

As a soil fungicide, the chemical was active against Rhizoctonia from cotton and Fusarium from tomato. For a positive effect, the compound was applied as an acetone solution at a rate of 36 lbs. per acre active material to the soil.

It should be understood from the foregoing that the above description is merely illustrative of the preferred embodiments and specific examples of the present invention and that in all of which embodiments and examples, variations, such as, e.g. those previously described, can be made by those skilled in the art without departing from the spirit and purview thereof, the invention being defined by the following claims.

What is claimed is:

1. Compounds of the general formula

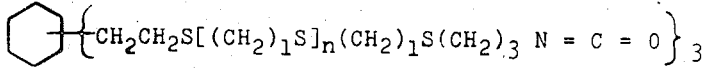

wherein 1 is a positive integer of from 1 to 12, and $n$ is a positive integer of from 1 to 100.

2. Compound of the formula $[CH_2 — S — CH_2 — CH_2 — CH_2 — N = C = O]_2$.

3. 3-β-hydroxyethylthiopropyl isocyanate.

* * * * *